(12) United States Patent
Elfstroem et al.

(10) Patent No.: US 9,789,563 B2
(45) Date of Patent: Oct. 17, 2017

(54) METHOD FOR ADDITIVE MANUFACTURING

(71) Applicant: Arcam AB, Moelndal (SE)

(72) Inventors: Isak Elfstroem, Kungsbacka (SE); Calle Hellestam, Goeteborg (SE); Mattias Fager, Goeteborg (SE)

(73) Assignee: Arcam AB, Moelndal (SE)

(*) Notice: Subject to any disclaimer, the term of this patent is extended or adjusted under 35 U.S.C. 154(b) by 547 days.

(21) Appl. No.: 14/547,538

(22) Filed: Nov. 19, 2014

(65) Prior Publication Data
US 2015/0174695 A1 Jun. 25, 2015

Related U.S. Application Data

(60) Provisional application No. 61/919,090, filed on Dec. 20, 2013.

(51) Int. Cl.
*B23K 15/00* (2006.01)
*B23K 15/02* (2006.01)
(Continued)

(52) U.S. Cl.
CPC ........ *B23K 15/0086* (2013.01); *B22F 3/1055* (2013.01); *B23K 15/02* (2013.01);
(Continued)

(58) Field of Classification Search
CPC .... B23K 15/0086; B23K 15/02; B23K 15/10; B23K 26/345; B23K 26/08
(Continued)

(56) References Cited

U.S. PATENT DOCUMENTS 2,264,968 A 12/1941 De Forest
2,323,715 A 7/1943 Kuehni
(Continued)

FOREIGN PATENT DOCUMENTS

CA 2860188 A1 6/2006
CN 101607311 A 12/2009
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — Samuel M Heinrich
(74) *Attorney, Agent, or Firm* — Alston & Bird LLP

(57) ABSTRACT

The invention relates to a method for forming a three-dimensional article through successive fusion of locations of a powder bed. The method comprising: providing a model of said three-dimensional article; applying a powder layer on a work table; determining a maximum scan length of an energy beam; directing said energy beam from a first energy beam source over said work table with constant energy causing said first powder layer to fuse in first selected locations according to said model to form a first cross section of said three-dimensional article, wherein locations with a shorter scan length than said maximum scan length is provided with a time sink before and/or after said scan line so that the time period between each two adjacent scan lines is constant throughout the manufacture of said three-dimensional article.

25 Claims, 8 Drawing Sheets

(51) Int. Cl.
  *B23K 15/10* (2006.01)
  *B23K 26/34* (2014.01)
  *B23K 26/08* (2014.01)
  *B22F 3/105* (2006.01)
  *B29C 67/00* (2017.01)

(52) U.S. Cl.
  CPC ............. *B23K 15/10* (2013.01); *B23K 26/08* (2013.01); *B29C 67/0077* (2013.01); *B29C 67/0088* (2013.01); *Y02P 10/295* (2015.11)

(58) Field of Classification Search
  USPC ............ 219/121.13, 121.14, 121.16, 121.17, 219/121.35, 121.63–121.66, 121.85
  See application file for complete search history.

(56) References Cited

U.S. PATENT DOCUMENTS

| | | | |
|---|---|---|---|
| 3,634,644 A * | 1/1972 | Ogden | B23K 31/022 219/102 |
| 3,838,496 A * | 10/1974 | Kelly | B23K 9/0209 219/126 |
| 3,882,477 A | 5/1975 | Mueller | |
| 4,314,134 A * | 2/1982 | Schumacher | B23K 15/02 219/121.14 |
| 4,348,576 A | 9/1982 | Anderl et al. | |
| 4,352,565 A | 10/1982 | Rowe et al. | |
| 4,401,719 A | 8/1983 | Kobayashi et al. | |
| 4,541,055 A * | 9/1985 | Wolfe | B23K 26/08 219/121.82 |
| 4,818,562 A | 4/1989 | Arcella et al. | |
| 4,863,538 A | 9/1989 | Deckard | |
| 4,888,490 A | 12/1989 | Bass et al. | |
| 4,927,992 A | 5/1990 | Whitlow et al. | |
| 4,958,431 A * | 9/1990 | Clark | B23K 9/046 29/402.09 |
| 4,988,844 A | 1/1991 | Dietrich et al. | |
| 5,118,192 A | 6/1992 | Chen et al. | |
| 5,135,695 A | 8/1992 | Marcus | |
| 5,167,989 A | 12/1992 | Dudek et al. | |
| 5,182,170 A | 1/1993 | Marcus et al. | |
| 5,204,055 A | 4/1993 | Sachs et al. | |
| 5,247,560 A | 9/1993 | Hosokawa et al. | |
| 5,393,482 A | 2/1995 | Benda et al. | |
| 5,483,036 A | 1/1996 | Giedt et al. | |
| 5,511,103 A | 4/1996 | Hasegawa | |
| 5,595,670 A | 1/1997 | Mombo Caristan | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,419,203 B1 | 7/2002 | Dang | |
| 6,537,052 B1 | 3/2003 | Adler | |
| 6,554,600 B1 | 4/2003 | Hofmann et al. | |
| 6,583,379 B1 | 6/2003 | Meiners et al. | |
| 6,676,892 B2 | 1/2004 | Das et al. | |
| 6,724,001 B1 | 4/2004 | Pinckney et al. | |
| 6,746,506 B2 | 6/2004 | Liu et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,452,500 B2 | 11/2008 | Uckelmann | |
| 7,537,722 B2 | 5/2009 | Andersson et al. | |
| 7,540,738 B2 | 6/2009 | Larsson et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,754,135 B2 | 7/2010 | Abe et al. | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,310,188 B2 | 4/2016 | Snis | |
| 9,505,172 B2 | 11/2016 | Ljungblad | |
| 9,550,207 B2 | 1/2017 | Ackelid | |
| 2002/0104973 A1 | 8/2002 | Kerekes | |
| 2002/0152002 A1 | 10/2002 | Lindemann et al. | |
| 2002/0195747 A1 | 12/2002 | Hull et al. | |
| 2003/0043360 A1 | 3/2003 | Farnworth | |
| 2003/0133822 A1 | 7/2003 | Harryson | |
| 2003/0205851 A1 | 11/2003 | Laschutza et al. | |
| 2004/0012124 A1 | 1/2004 | Li et al. | |
| 2004/0026807 A1 | 2/2004 | Andersson et al. | |
| 2004/0084814 A1 | 5/2004 | Boyd et al. | |
| 2004/0104499 A1 | 6/2004 | Keller | |
| 2004/0148048 A1 | 7/2004 | Farnworth | |
| 2004/0173496 A1 | 9/2004 | Srinivasan | |
| 2004/0173946 A1 | 9/2004 | Pfeifer et al. | |
| 2004/0204765 A1 | 10/2004 | Fenning et al. | |
| 2004/0217095 A1 | 11/2004 | Herzog | |
| 2005/0173380 A1 | 8/2005 | Carbone | |
| 2005/0186538 A1* | 8/2005 | Uckelmann | A61C 13/0004 433/201.1 |
| 2006/0108712 A1 | 5/2006 | Mattes | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0074659 A1 | 4/2007 | Wahlstrom | |
| 2007/0175875 A1 | 8/2007 | Uckelmann et al. | |
| 2007/0179655 A1 | 8/2007 | Farnworth | |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2009/0206056 A1 | 8/2009 | Xu et al. | |
| 2010/0007062 A1 | 1/2010 | Larsson et al. | |
| 2010/0260410 A1 | 10/2010 | Taminger et al. | |
| 2010/0310404 A1 | 12/2010 | Ackelid | |
| 2010/0316856 A1 | 12/2010 | Currie et al. | |
| 2011/0061591 A1 | 3/2011 | Stecker | |
| 2011/0114839 A1 | 5/2011 | Stecker et al. | |
| 2011/0133367 A1 | 6/2011 | Weidinger et al. | |
| 2011/0240607 A1 | 10/2011 | Stecker et al. | |
| 2011/0241575 A1 | 10/2011 | Caiafa et al. | |
| 2011/0293770 A1 | 12/2011 | Ackelid et al. | |
| 2011/0293771 A1 | 12/2011 | Oberhofer et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0164322 A1 | 6/2012 | Teulet et al. | |
| 2012/0183701 A1 | 7/2012 | Pilz et al. | |
| 2012/0193530 A1 | 8/2012 | Parker et al. | |
| 2012/0211155 A1 | 8/2012 | Wehning et al. | |
| 2012/0223059 A1 | 9/2012 | Ackelid | |
| 2012/0225210 A1 | 9/2012 | Fruth | |
| 2012/0237745 A1 | 9/2012 | Dierkes et al. | |
| 2012/0266815 A1 | 10/2012 | Brunermer | |
| 2013/0055568 A1 | 3/2013 | Dusel et al. | |
| 2013/0162134 A1 | 6/2013 | Mattausch et al. | |
| 2013/0186514 A1 | 7/2013 | Zhuang et al. | |
| 2013/0216959 A1 | 8/2013 | Tanaka et al. | |
| 2013/0264750 A1 | 10/2013 | Hofacker et al. | |

(56) References Cited

U.S. PATENT DOCUMENTS

| | | |
|---|---|---|
| 2013/0270750 A1 | 10/2013 | Green |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| FR | 2980380 A1 | 3/2013 |
| JP | 2003241394 A | 8/2003 |
| JP | 2003245981 | 9/2003 |
| JP | 2009006509 A | 1/2009 |
| SE | 524467 C2 | 8/2004 |
| WO | WO 93/08928 A1 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/142492 A1 | 9/2015 |

OTHER PUBLICATIONS

European Search Report dated Feb. 16, 2012, for corresponding Application No. EP07852089.7.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, dated Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, dated Apr. 4, 2014, 15 pages, European Patent Office, Germany.

International Preliminary Examining Authority, International Preliminary Report on Patentability for International Application No.

(56) References Cited

OTHER PUBLICATIONS

PCT/EP2012/074383, including Applicant's Sep. 6, 2013 Reply to ISA's Feb. 27, 2013 Written Opinion, dated Jan. 20, 2014, 16 pages, European Patent Office, The Netherlands.
International Preliminary Report on Patentability, dated Nov. 27, 2009, of corresponding international application No. PCT/SE2007/001084.
International Search Report dated Apr. 9, 2010 for Application No. PCT/SE2009/050901.
International Search Report dated Sep. 17, 2008 for Application No. PCT/SE2008/000007.
International Search Report dated Sep. 2, 2008 of corresponding international application No. PCT/SE2007/001084.
International Searching Authority (ISA), International Search Report and Written Opinion for International Application No. PCT/EP2012/076025, dated May 17, 2013, 11 pages, European Patent Office, The Netherlands.
International Searching Authority, International Search Report and Written Opinion for International Application No. PCT/EP2012/074383, dated Feb. 27, 2013, 10 pages, European Patent Office, The Netherlands.
International Searching Authority, International Search Report for International Application No. PCT/SE2011/050093, dated Oct. 20, 2011, 5 pages, The Swedish Patent and Registration Office, Sweden.
Weigel, Th., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/EP2012/057470, dated Jan. 24, 2013, 1 page, European Patent Office, The Netherlands.
International Searching Authority, International Search Report for International Application No. PCT/EP2012/058733, Mar. 5, 2013, 4 pages, European Patent Office, The Netherlands.
Gibson, D.W., et al., "Additive Manufacturing Technologies: Rapid Prototyping to Direct Digital Manufacturing", 2010, pp. 126-129, Springer, New York.

\* cited by examiner

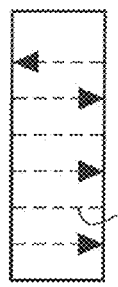
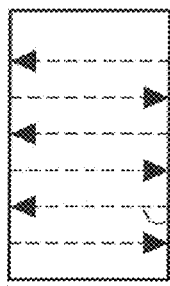
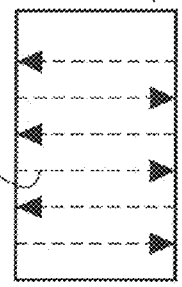
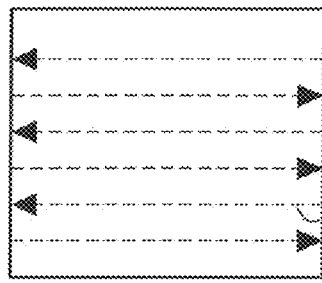
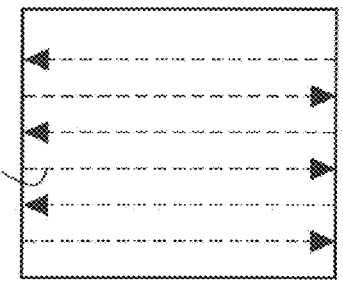
FIG. 1A(i)    FIG. 1B(i)
FIG. 1A(ii)   FIG. 1B(ii)
FIG. 1A(iii)  FIG. 1B(iii)

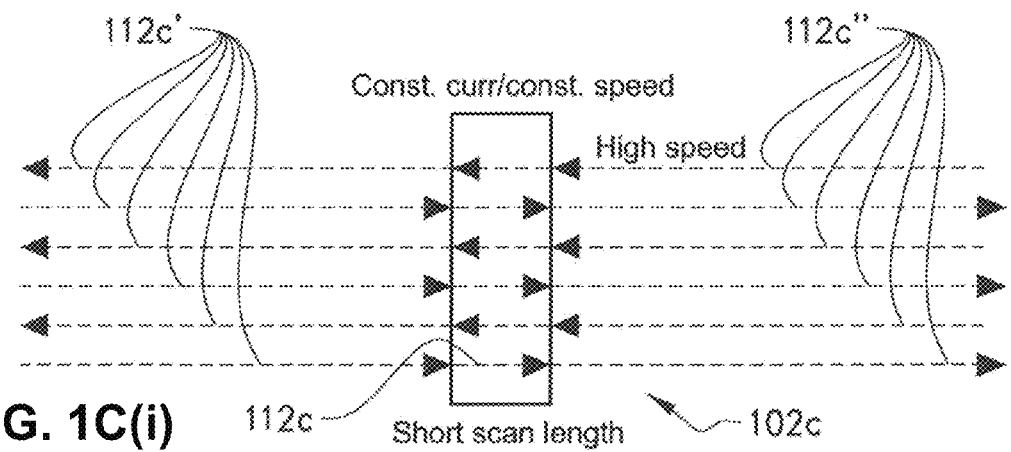
FIG. 1C(i)
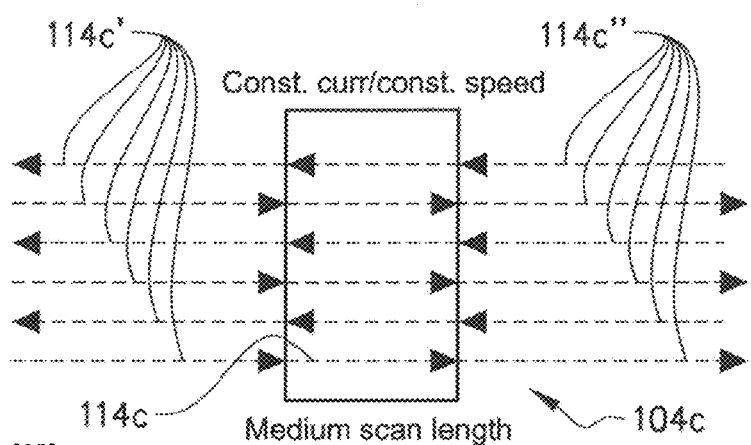
FIG. 1C(ii)
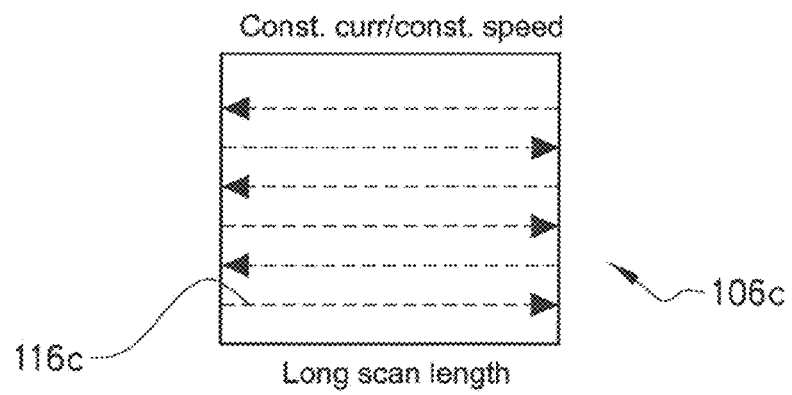
FIG. 1C(iii)

METHOD FOR ADDITIVE MANUFACTURING

CROSS-REFERENCE TO RELATED APPLICATIONS

This application claims priority to and the benefit of U.S. Provisional Patent Application Ser. No. 61/919,090, filed Dec. 20, 2013, the contents of which as are hereby incorporated by reference in their entirety.

BACKGROUND

Related Field

The present invention relates to a method for additive manufacturing of three-dimensional articles.

Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which the three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

FIGS. 1A(i)-1A(iii) depict a first prior art hatch algorithm for three different layers of a three-dimensional article where the same melt beam current for an entire layer is used. The melt beam current is depending upon the entire layer area. No correction or compensation was made for long or short scan length, leading to vast differences in melt behavior of the two. For example short scan lengths were excessively overmelted, whereas long scan length lacked energy contribution. As a result the microstructure was coarse and heavily swelled on small areas and fine but filled with pores on longer scan length.

FIGS. 1B(i)-1B(ii) depict a second prior art hatch algorithm for three different layers of a three-dimensional article where the energy and scan speed of the energy beam is adjusted depending on the scan length and therefore kept the time in between hatches fairly constant. However, varying the energy and the scan speed will change other parameters such as the solidification rate and thermal gradient which in turn determines the microstructural properties.

There is a demand for additive manufacturing techniques which is capable of building three-dimensional articles with predictable and repeatable material characteristics which is independent of the shape and size of the three dimensional article to be built.

BRIEF SUMMARY

An object of the invention is to provide a method for additive manufacturing which solves the above mentioned demand.

The above mentioned object is achieved by the features in the method according to claim 1.

In a first aspect of the invention it is provided a method for forming a three-dimensional article through successive fusion of locations of a powder bed, which locations correspond to successive cross sections of the three-dimensional article, the method comprising the steps of: providing a model of the three-dimensional article; applying a first powder layer on a work table; determining a maximum scan line time of an energy beam for a first cross section of the three-dimensional article; directing the energy beam from a first energy beam source over the work table with a constant energy causing the first powder layer to fuse in first selected locations according to the model to form the first cross section of the three-dimensional article, where the first energy beam is fusing the selected locations with scan lines in a first direction, wherein locations with a shorter scan line time than the maximum scan line time is provided with a time sink before and/or after the scan line so that the scan line time plus the time sink is constant for the first cross section of the three-dimensional article.

The advantage of the present invention is that the control and predictability of the material characteristics, such as tensile strength, ductility and/or microstructure is improved compared to the known methods for forming a three-dimensional article with additive manufacturing.

In an example embodiment of the present invention the maximum scan line time for the energy beam is determined for the entire three-dimensional article. Instead of determining the maximum scan line time for a first layer and then building the layer, determine a new maximum scan line time for a second layer and then building the layer and so on, the maximum scan line times may be determined for the entire three dimensional article before the article is started to be manufactured.

In still another example embodiment of the present invention the scan line time plus the time sink is constant throughout the three-dimensional article. Depending on what kind of article to be produced it may sometimes be useful to set the scan line time plus the time sink to a constant value for the entire article. Alternatively the scan line time plus the time sink may vary from one layer to another.

In still another example embodiment the scan lines in the first direction are straight or meandering scan lines. Any form of the scan lines may be used which may fulfill the desired material characteristics and the desired total build time.

In still another example embodiment every second scan line may be in a direction opposite to the other scan lines. In another example embodiment the scan speed of at least one scan line may be different to another scan line. In still another example embodiment the scan speed is fixed for at least one scan line. In still another example embodiment of the present invention the energy beam is switched off during the time sink. By varying the scan lien direction and/or the scan speed the material characteristics may be tailorized. The beam spot parameters may be set by the machine operator before starting the build on order to fulfill specific requirements.

In still another example embodiment the method further comprising the steps of: setting an energy density per time unit for the energy beam during the time sink to a predetermined level which will leave powder material in a non-sintered and non-fused state, directing the energy beam outside the selected locations during the time sink. This energy density per unit time may be synchronized with a heat model in order to keep the build temperature of the three dimensional article within a predetermined temperature interval. In such case there is a minimum of idling time for the energy beam spot when the energy spot is not used for fusing the powder material.

In still another example embodiment the energy beam is defocused and/or the scanning speed is increased and/or the power of the energy beam is lowered and/or dithering the energy beam during the time sink for leaving the powder material outside the selected locations non-fused and non-sintered. There are a number of different beam parameters which may be used in order to achieve a desired energy density per unit time on the powder surface.

In still another example embodiment more than one energy beam source may be used for fusing the powder material. The plurality of energy beam sources may be of the same type or different type. In an example embodiment every second layer is melted with a first energy beam source while the other layers are melted with a second energy beam source. The first and second energy beam source may be of the same type of different type.

In still another example embodiment it is provided a computer readable medium having stored thereon a program element. The program element may be configured and arranged when executed on a computer to implement a method for forming a three-dimensional article through successive fusion of locations of a powder bed, which locations correspond to successive cross sections of the three-dimensional article. The computer readable storage medium may be a control unit. The computer readable storage medium and the program element, which may comprise computer-readable program code portions embodied therein, may further be contained within a non-transitory computer program product. Further details in this regard are provided elsewhere herein.

The non-transitory computer program product and the computer-readable program code portions embodied therein may comprise an executable portion configured for, upon receipt of a model of at least one three dimensional article, applying a first powder layer on a work table so as to initiate forming the three-dimensional article through successive fusion of locations of a powder bed, which locations correspond to successive cross sections of the three-dimensional article; an executable portion configured for determining a maximum scan line time of an energy beam for a first cross section of the three-dimensional article; and an executable portion configured for directing the energy beam from a first energy beam source over the work table with a constant energy causing the first powder layer to fuse in first selected locations according to the model to form the first cross section of the three-dimensional article, wherein: the first energy beam is fusing the selected locations with scan lines in a first direction; and locations with a shorter scan line time than the maximum scan line time are provided with a time sink at least one of before or after the scan line so that the scan line time plus the time sink is constant for the first cross section of the three-dimensional article.

All examples and exemplary embodiments described herein are non-limiting in nature and thus should not be construed as limiting the scope of the invention described herein. Still further, the advantages described herein, even where identified with respect to a particular exemplary embodiment, should not be necessarily construed in such a limiting fashion.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1A(i)-1A(iii) depicts a first prior art hatch algorithm for three different layers of a three-dimensional article;

FIGS. 1B(i)-1B(iii) depicts a second prior art hatch algorithm for three different layers of a three-dimensional article;

FIGS. 1C(i)-1(C)(iii) depict a first example embodiment of an inventive hatch algorithm according to the present invention for three different layers of a three-dimensional article;

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron gun, a linear accelerator and so on.

Figure 3:
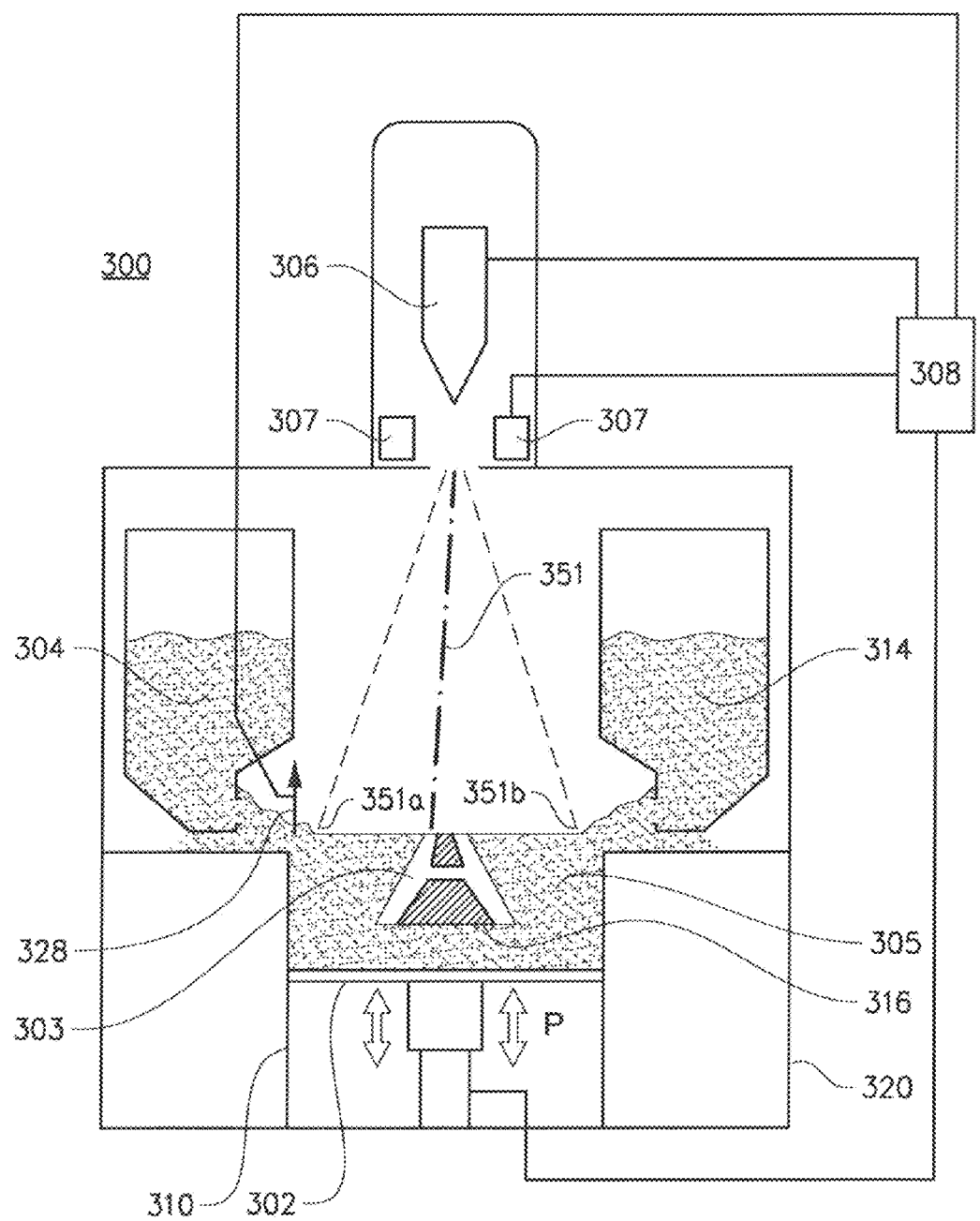
FIG. 3 depicts an example embodiment of an apparatus in which the present invention may be implemented.

FIG. 3 depicts an example embodiment of a freeform fabrication or additive manufacturing apparatus 300 according to prior art in which the present invention may be implemented. The apparatus 300 comprises an electron source 306; two powder hoppers 304, 314; a start plate 316; a build tank 310; a powder distributor 328; a build platform 302; a vacuum chamber 320, a beam deflection unit 307 and a control unit 308. FIG. 3 discloses only one beam source for sake of simplicity. Of course, any number of beam sources may be used.

The vacuum chamber 320 is capable of maintaining a vacuum environment via or by means of a vacuum system, which system may comprise a turbomolecular pump, a scroll pump, an ion pump and one or more valves which are well known to a skilled person in the art and therefore need no further explanation in this context. The vacuum system may be controlled by the control unit 308. In another embodiment the build tank may be provided in an enclosable chamber provided with ambient air and atmosphere pressure. In still another example embodiment the build chamber may be provided in open air.

The electron beam source 306 is generating an electron beam, which may be used for melting or fusing together powder material 305 provided on the work table. At least a portion of the electron beam source 306 may be provided in the vacuum chamber 320. The control unit 308 may be used for controlling and managing the electron beam emitted from the electron beam source 306. The electron beam 351 may be deflected between at least a first extreme position 351a and at least a second extreme position 351b.

At least one focusing coil, at least one deflection coil and an electron beam power supply may be electrically connected to the control unit 308. The beam deflection unit 307 may comprise the at least one focusing coil, the at least one deflection coil and optionally at least one astigmatism coil. In an example embodiment of the invention the electron beam source may generate a focusable electron beam with an accelerating voltage of about 60 kV and with a beam power in the range of 0-3 kW. The pressure in the vacuum chamber may be in the range of $10^{-3}$-$10^{-6}$ mBar when building the three-dimensional article by fusing the powder layer by layer with the energy beam source 306.

Instead of melting the powder material with an electron beam, one or more laser beams and/or electron beams may be used. Each laser beam may normally be deflected by one or more movable mirror provided in the laser beam path between the laser beam source and the work table onto which the powder material is arranged which is to be fused by the laser beam. The control unit 308 may manage the deflection of the mirrors so as to steer the laser beam to a predetermined position on the work table.

The powder hoppers 304, 314 may comprise the powder material to be provided on the start plate 316 in the build tank 310. The powder material may for instance be pure metals or metal alloys such as titanium, titanium alloys, aluminum, aluminum alloys, stainless steel, Co—Cr—W alloy, etc. Instead of two powder hoppers, one powder hopper may be used. Other designs and/or mechanism for of the powder supply may be used, for instance a powder tank with a height-adjustable floor.

The powder distributor 328 may be arranged to lay down a thin layer of the powder material on the start plate 316. During a work cycle the build platform 302 will be lowered successively in relation to the energy beam source after each added layer of powder material. In order to make this movement possible, the build platform 302 is in one embodiment of the invention arranged movably in vertical direction, i.e., in the direction indicated by arrow P. This means that the build platform 302 may start in an initial position, in which a first powder material layer of necessary thickness has been laid down on the start plate 316. A first layer of powder material may be thicker than the other applied layers. The reason for starting with a first layer which is thicker than the other layers is that one may not want a melt-through of the first layer onto the start plate. The build platform may thereafter be lowered in connection with laying down a new powder material layer for the formation of a new cross section of a three-dimensional article. Means for lowering the build platform 302 may for instance be through a servo engine equipped with a gear, adjusting screws, etc.

Figure 4:
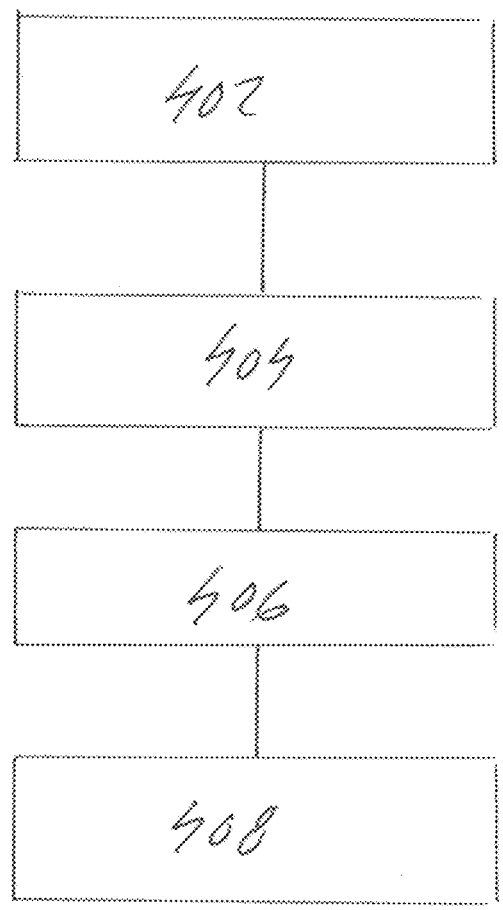
FIG. 4 depicts in a schematic way a flow chart of the inventive method.

In FIG. 4 it is depicted a schematic flow chart of an example embodiment of a method according to the present invention for forming a three-dimensional article through successive fusion of locations of a powder bed, which locations correspond to successive cross sections of the three-dimensional article. The method comprising a first step 402 of providing a model of the three dimensional article. The model may be a computer model generated via a CAD (Computer Aided Design) tool. More than one three-dimensional article may be built simultaneously, where the three dimensional articles may be equal or different to each other.

In a second step 404 a first powder layer is provided on a work table. The work table may be the start plate 316, the build platform 302, a powder bed or a partially fused powder bed. The powder may be distributed evenly over the worktable according to several methods. One way to distribute the powder is to collect material fallen down from the hopper 304, 314 by a rake system. The rake or powder distributor 328 may be moved over the build tank and thereby distributing the powder over the work table.

A distance between a lower part of the rake and the upper part of the start plate or previous powder layer determines the thickness of powder distributed over the work table. The powder layer thickness can easily be adjusted by adjusting the height of the build platform 302.

In a third step 406 a maximum scan line time is determined for an energy beam for a first cross section of the three-dimensional article. In another embodiment a maximum scan line time is determined for an energy beam for the entire three-dimensional article, i.e., for all cross sections of the three dimensional article. The maximum scan line time may be equal for all layers of may differ from one lay to another. A three-dimensional article built up layerwise will in most cases have a plurality of different cross sections. In the cross sections one may be able to find the longest single scan line, which may be straight, curved or meander formed. When the longest scan line has been found the time is determined for fusing the scan line. Prior simulations of the formation of the three dimensional article may result in a particular scan line time for the longest scan line for achieving material properties such as tensile strength, ductility, and microstructure. The maximum scan line time may be the time for fusing the longest scan line.

In a fourth step 408 the energy beam is directed from a first energy beam source over the work table with a constant energy causing the first powder layer to fuse in first selected locations according to the model to form the first cross section of the three-dimensional article, where the first energy beam is fusing the selected locations with scan lines in a first direction. Locations with a shorter scan line time than the maximum scan line time may be provided with a time sink before and/or after the scan line so that the scan line time plus the time sink is constant for the first cross section of the three dimensional article. In another embodiment the scan line time plus the time sink is constant throughout the manufacture of the three-dimensional article.

FIGS. 1C(i)-1C(iii) depict a first example embodiment of an inventive hatch algorithm according to the present invention for three different layers 102c, 104c and 106c of a three-dimensional article. The topmost layer is narrower than the middle layer, which in turn is narrower than the lowermost layer in the scanning direction. In the exemplified embodiment in FIGS. 1C(i)-1C(iii) the energy from the energy beam is constant and the same for all three layers. The energy beam may be an electron beam or a laser beam. In case of an electron beam the electron beam current is fixed for all three layers and in the case of a laser beam the laser beam power is fixed for all three layers. In the exemplified embodiment in FIGS. 1C(i)-1C(iii) the scanning speed is also constant and the same for all three layers. In another embodiment the scanning speed may alter during the scanning length for at least some of the scanning lines.

The first layer 102c is exemplified by having 6 scanning lines 112c. Every second scanning line is in a reverse scanning direction compared to the other scanning lines. Alternatively, the scan direction may only be from one direction to the other. Before the scanning lines 112c it is provided a first time sink 112c' and after the scanning lines it is provided a second time sink 112c". The time sink is used for maintaining the scan line time plus the time sink constant for at least one cross section for the three dimensional article regardless of the shape and dimension of the cross section to be melted. Alternatively the scan line time plus the time sink is constant for every cross section throughout the three dimensional article regardless of the shape and dimension of the cross sections to be melted. The sum of a scan line time and corresponding time sink(s) is equal to a constant throughout a cross section of the three dimensional article. The only exception to this rule may be the time between the last scan line in a first layer and a first scan line in a second layer. In between the last scan line in the first layer and the first scan line in a second layer a new powder layer needs to be applied.

In another embodiment the sum of scan line time and time sink is constant for each and every scan line which is adjacent in time, which means that the time sink plus the scan line time for the last scan line in a first layer and a first scan line time plus the time sink for a first scan line in a consecutive layer is equal to the time sink plus the scan line time for scan lines within the first layer or the time sink plus the scan line time for scan lines within the second layer.

For instance, the sum of the first time sink 112c' and the second time sink 112c" and the time for fusing a scan line 112c is equal to a first time sink 114c' and a second time sink 114c" and the time for fusing a scan line 114c, which in turn is equal to the time for fusing scan line 116c.

In FIGS. 1C(i)-1C(iii) the time sink is exemplified to be before and after the scan line, however, in another embodiment the time sink may only be provided before or after the scan line. In the bottommost layer 106c in FIGS. 1C(i)-1C(iii) there is no time sink before or after the scan lines 116c. In the bottommost layer 106c the time sink is equal to zero and the scan line time is equal to the maximum scan line time which in turn is equal to the constant for that particular layer.

Figure 2A:
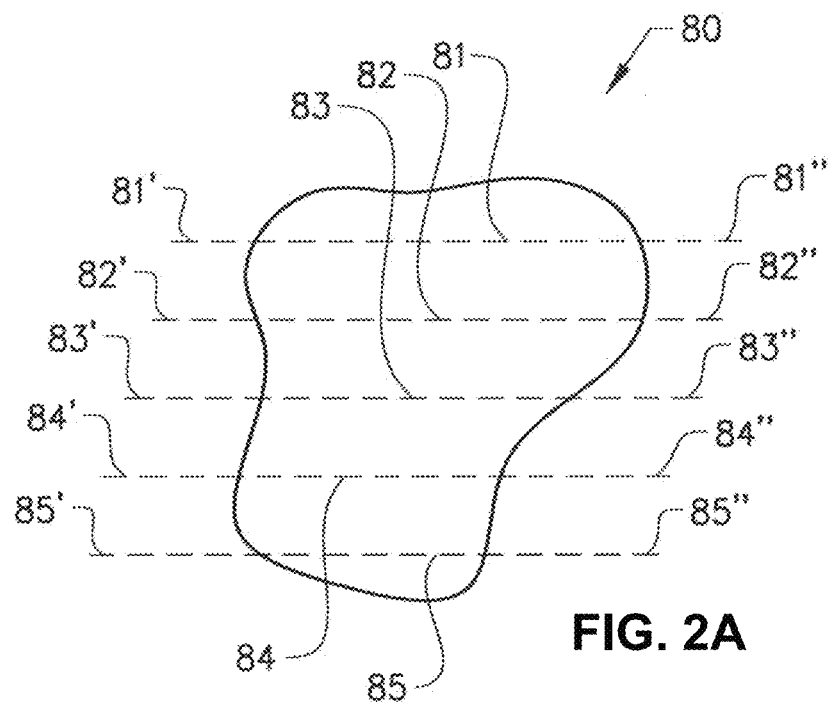
FIG. 2A depicts a second example embodiment of an inventive hatch algorithm according to the present invention for a single layer of a three-dimensional article.

FIG. 2A depicts a second example embodiment of an inventive hatch algorithm according to the present invention for a single layer 80 of a three-dimensional article. In this embodiment the cross section is irregular, which means that the time sink needs to be varied in order to keep the sum of the scan line time and its corresponding time sinks to a constant value. A first scan line 81 has a first time sink 81' before the scan line 81 and a second time sink 81" after the scan line 81. The second scan line 82 is slightly shorter than the first scan line. In order to keep the sum of the time sinks 82', 82" and its corresponding scan line time 82 equal to the sum of the time sinks 81', 81" and its corresponding scan line time 81 the sum of the time sinks 82', 82" needs to be longer than the sum of the time sink 81', 81" before and after the first scan line 81, because the duration of the first scan line 81 is longer than the duration of the second scan line 82.

In FIG. 2A the duration of the first scan line 81 is longer than the duration of the second scan line which in turn is longer than the third scan line 83, which in turn is longer than the fourth scan line 84 which in turn is longer than the fifth scan line 85. This is particularly true if the scan speed is constant for layer 80. However, it may be true for cases when the scan speed is altered within a scan line as well for maintaining the overall build temperature and final material characteristics of the three dimensional article.

Figure 2B:
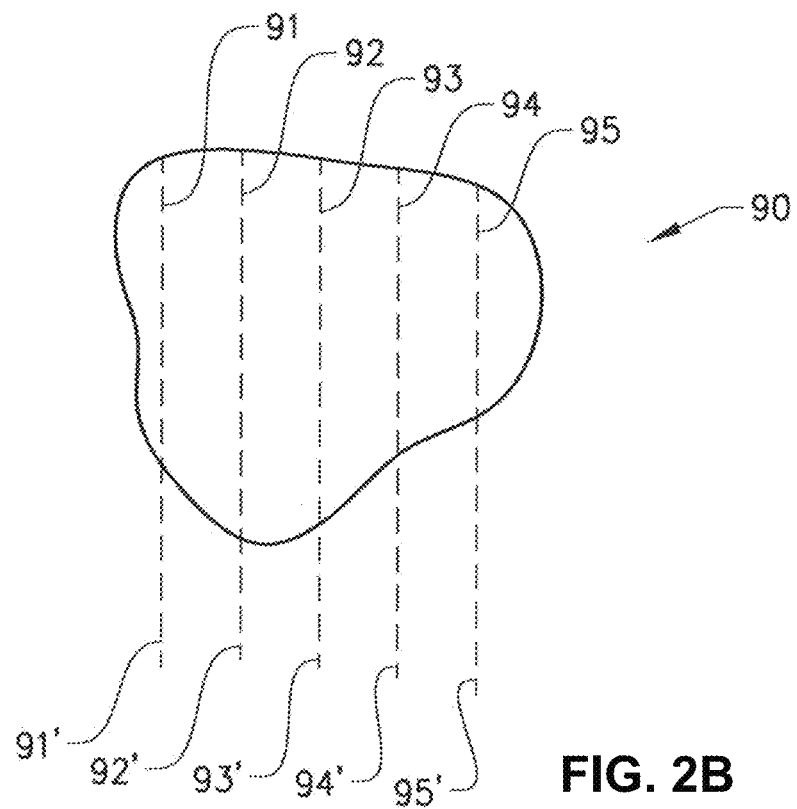
FIG. 2B depicts a third example embodiment of an inventive hatch algorithm according to the present invention for a single layer of a three-dimensional article.

FIG. 2B depicts yet another example embodiment of an inventive hatch algorithm according to the present invention for a single layer 90 of a three-dimensional article. In this case the scan lines are vertical instead of horizontal as in the other example embodiments. Obviously, the scan direction for any particular layer may be rotated any angle with respect to the previous layer's scanning direction. In FIG. 2B it is depicted that the time sink 91', 92', 93', 94', 95' is after its respective scan line 91, 92, 93, 94, 95 if the scanning direction is from up to down. In another embodiment the time sink may be provided before the respective scan line. The sum of a time of a particular scan line and its corresponding time sink is however constant throughout the layer.

In another embodiment of the present invention all scan lines in the three dimensional article is provided with a time sink before and/or after the scan line, which means that in such an embodiment there are no scan lines such as scan line 116c in FIGS. 1C(i)-1C(iii) which has no time sink at all.

In still another embodiment the scan lines may be meandering or curved instead of straight lines. In still another example embodiment the scan lines may be parallel in at least one layer.

In still another example embodiment the scan speed may be varied for at least one scan line. If a short time sink is provided in front of or after a scan line or in a case when there are no time sink at all, there may be necessary to decrease the scan speed at the end of the scan line in order to not overmelt the area in the vicinity of the outer surface of the three dimensional article.

During the time sink the energy beam may be present at a position of the powder area which is not supposed to be melted. The scanning speed may be increased and/or the energy beam spot may be out of focus on the powder surface and/or the energy beam may be dithered (switched on and off) for making sure that the powder material at such locations is not melted. In another embodiment the energy beam is deflected to a position outside the powder layer during the time sink. In still another example embodiment the energy beam is melting another object during the time sink. The positioning of the beam spot for fusing the powder material during the time sink may be synchronized with the heat model in order to keep the build temperature within a predetermined temperature range.

In another embodiment a first energy beam may be fusing a first article with parallel scan lines in a first direction and a second article with parallel scan lines in a second direction.

The first energy beam may be an electron beam or a laser beam. The beam is directed over the work table from instructions given by the control unit 308. In the control unit 308 instructions for how to control the beam source 306 for each layer of the three-dimensional article may be stored.

The reason for keeping the sum of the scan line times and its corresponding time sinks to be constant is that if a scan line would arrive at a previously fused area to early the surface and/or the bulk temperature of the three dimensional article may increase over a predetermined maximum temperature, which in turn may affect the microstructure, internal stress and/or tensile strength of the material.

In an example embodiment of the present invention the scan lines in at least one layer of at least a first three-dimensional article are fused with a first energy beam from a first energy beam source and at least one layer of at least a second three-dimensional article is fused with a second energy beam from a second energy beam source. More than one energy beam source may be used for fusing the scan lines. In another example embodiment a first energy beam source may be used for scanning directions within a first range of angles and a second energy beam source may be used for scanning directions within a second range of angles. The first and second ranges of angles may be overlapping or non-overlapping with each other. A first energy beam may emanate from an electron beam source and the second energy beam from a laser source. The first and second energy beam sources may be of the same type, i.e., a first and second electron beam source or a first and second laser beam source. The first and second energy beam sources may be used in sequence or simultaneously.

By using more than one energy beam source the build temperature of the three-dimensional build may more easily be maintained compared to if just one beam source is used. The reason for this is that two beam may be at more locations simultaneously than just one beam. Increasing the number of beam sources will further ease the control of the build temperature. By using a plurality of energy beam sources a first energy beam source may be used for melting the powder material and a second energy beam source may be used for heating the powder material in order to keep the build temperature within a predetermined temperature range.

After a first layer is finished, i.e., the fusion of powder material for making a first layer of the three-dimensional article, a second powder layer is provided on the work table 316. The second powder layer is in certain embodiments preferably distributed according to the same manner as the previous layer. However, there might be alternative methods in the same additive manufacturing machine for distributing powder onto the work table. For instance, a first layer may be provided via or by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the work table 316, the energy beam from the energy beam source may be directed over the work table 316 causing the second powder layer to fuse in a selected locations according to the model to form second cross sections of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

The order of fusing different scan lines in a predetermined layer may also depend on a heat model for the three-dimensional article, i.e., the order may not be chosen stochastically without affecting a build temperature of the article which may need to be within a predetermined temperature range.

If the time interval between consecutive scan lines is too short the build temperature of a particular article will be too high since the second scan line will arrive adjacent to an already fused position in the particular article and thereby affect the build temperature of the article. On the other hand, if the time interval is too long, the build temperature will be too low since it will take too long time until the second scan line will arrive adjacent to the already fused position, i.e., the article has cooled down too much to maintain a predetermined build temperature interval. The time sink may need to be chosen out of a heat model for maintaining a predetermined build temperature of the three dimensional article.

In still another example embodiment it is provided a computer readable medium having stored thereon a program element. The program element may be configured and arranged when executed on a computer to implement a method for forming a three-dimensional article through successive fusion of locations of a powder bed, which locations correspond to successive cross sections of the three-dimensional article. The computer readable storage medium may be the control unit described elsewhere herein or an additional control unit, as such are commonly known and understood to involve. The computer readable storage medium and the program element, which may comprise computer-readable program code portions embodied therein, may further be contained within a non-transitory computer program product. Further details in this regard are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 5:
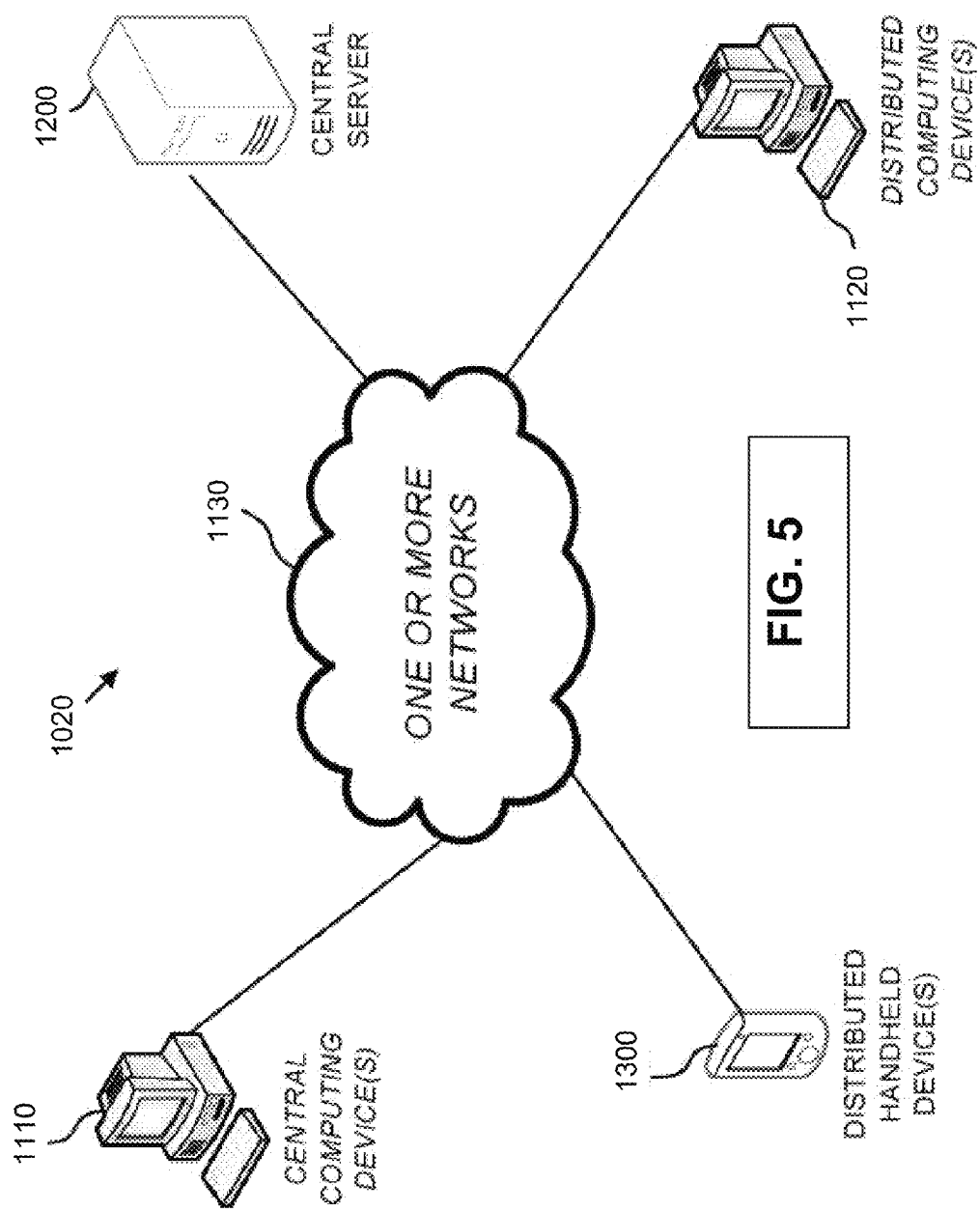
FIG. 5 is a block diagram of an exemplary system 1020 according to various embodiments.

FIG. 5 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 5 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 5 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 6A:
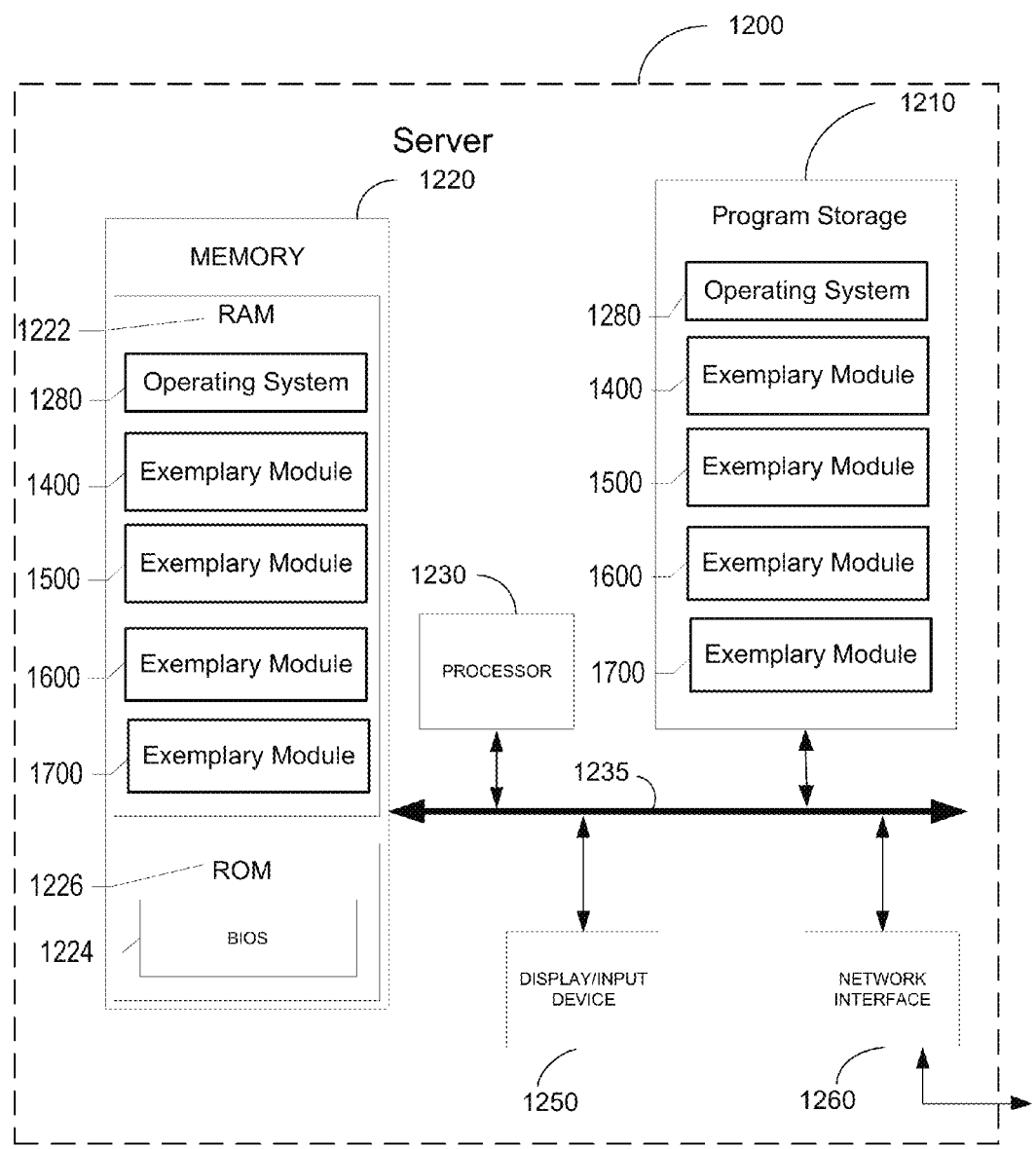
FIG. 6A is a schematic block diagram of a server 1200 according to various embodiments.

FIG. 6A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 6B:
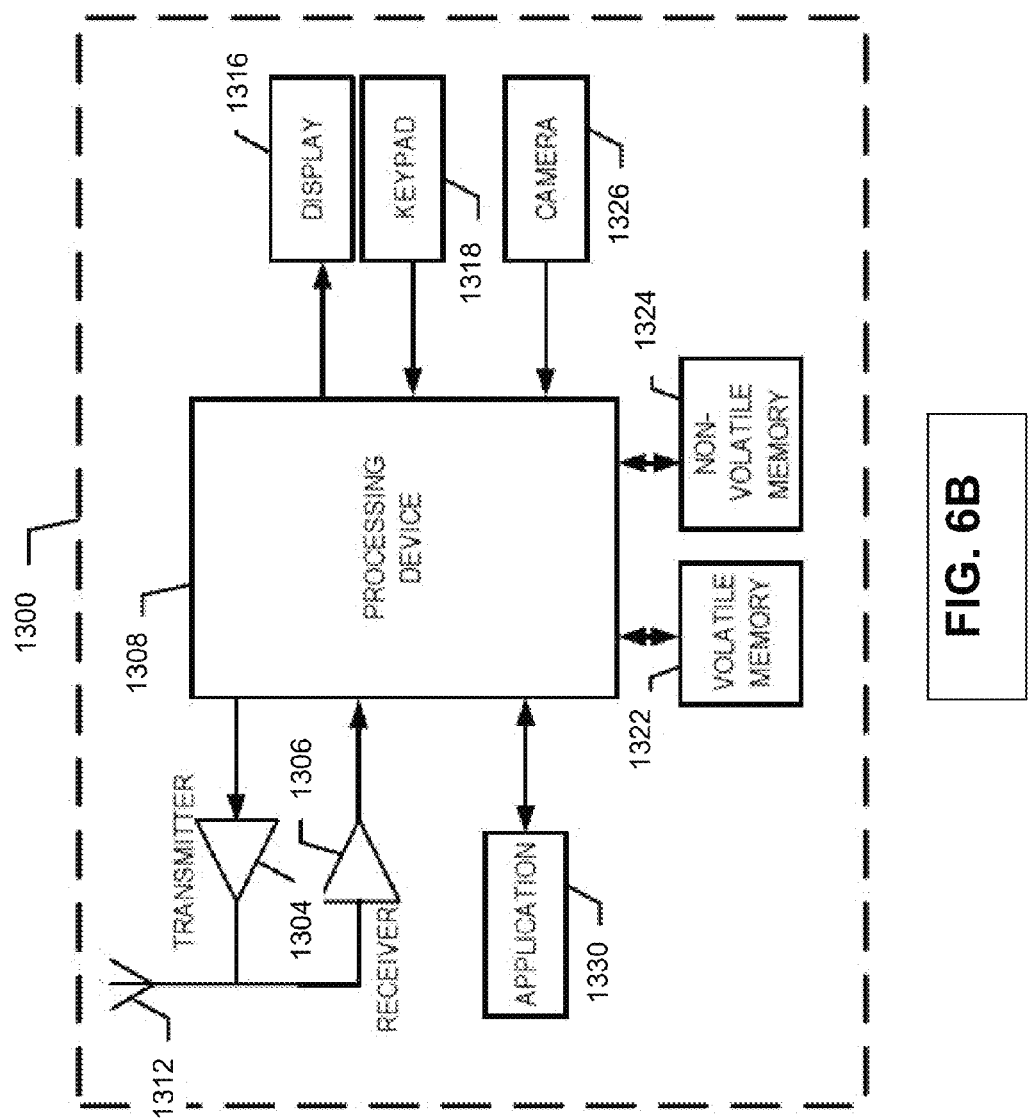
FIG. 6B is a schematic block diagram of an exemplary mobile device 1300 according to various embodiments.

FIG. 6B provides an illustrative schematic representative of a mobile device 1300 that can be used in conjunction with various embodiments of the present invention. Mobile devices 1300 can be operated by various parties. As shown in FIG. 6B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited to the above-described embodiments and many modifications are possible within the scope of the following claims. Such modifications may, for example, involve using a different source of energy beam than the exemplified electron beam such as a laser beam. Other materials than metallic powder may be used, such as the non-limiting examples of: electrically conductive polymers and powder of electrically conductive ceramics.

That which is claimed:

1. A method for forming a three-dimensional article through successive fusion of locations of a powder bed, which locations correspond to successive cross sections of the three-dimensional article, said method comprising the steps of:
providing a model of said three-dimensional article;
applying a first powder layer on a work table;

determining a maximum scan line time of an energy beam for a first cross section of the three-dimensional article; and directing said energy beam from a first energy beam source over said work table with a constant energy causing said first powder layer to fuse in first selected locations according to said model to form said first cross section of said three-dimensional article, wherein:

said first energy beam is fusing said selected locations with scan lines in a first direction; and locations with a shorter scan line time than said maximum scan line time are provided with a time sink at least one of before or after said scan line so that the scan line time plus the time sink is constant for said first cross section of said three-dimensional article.

2. The method according to claim 1, wherein said maximum scan line time for said energy beam is determined for the entire three-dimensional article.

3. The method according to claim 2, wherein said determination of said maximum scan line time is performed before starting the manufacture of the three-dimensional article.

4. The method according to claim 1, wherein said scan line time plus said time sink is constant throughout the three-dimensional article.

5. The method according to claim 1, wherein said scan line time plus said time sink has a first value for a first cross section of said three-dimensional article and said scan line time plus said time sink has a second value for a second cross section of said three-dimensional article, where said first and second values are different.

6. The method according to claim 1, wherein said scan lines in said first direction are at least one of straight or meandering scan lines.

7. The method according to claim 1, wherein every second scan line is in a direction opposite to the other scan lines.

8. The method according to claim 1, further comprising the step of varying the scan speed of at least one scan line.

9. The method according to claim 1, further comprising the step of fixing the scan speed of at least one scan line.

10. The method according to claim 1, wherein said energy beam is switched off during said time sink.

11. The method according to claim 1, further comprising the steps of:

setting an energy density per time unit for said energy beam during said time sink to a predetermined level which will leave powder material in a non-sintered and non-fused state; and directing said energy beam outside said selected locations during said time sink.

12. The method according to claim 11, wherein at least one of said energy beam is defocused, the scanning speed is increased, the power of the energy beam is lowered, or dithering said energy beam occurs during said time sink for leaving said powder material outside said selected locations non-fused and non-sintered.

13. The method according to claim 1, wherein said energy beam is at least one of an electron beam or a laser beam.

14. The method according to claim 1, wherein said powder is metallic powder.

15. The method according to claim 1, wherein the scan lines in at least one layer of at least a first three-dimensional article are fused with a first energy beam from a first energy beam source and a second energy beam from a second energy beam source.

16. The method according to claim 1, wherein the scan lines in at least one layer of at least a first three-dimensional article are fused with a first energy beam from a first energy beam source and the scan lines in at least one layer of at least a second three-dimensional article are fused with a second energy beam from a second energy beam source.

17. The method according to claim 15, wherein said first energy beam is emanating from a first electron beam source and said second energy beam is emanating from a first laser beam source.

18. The method according to claim 15, wherein said first energy beam is emanating from a first electron beam source and said second energy beam is emanating from a second electron beam source.

19. The method according to claim 15, wherein said first energy beam is emanating from a first laser beam source and said second energy beam is emanating from a second laser beam source.

20. The method according to claim 16, wherein said first and second energy beams are fusing at least one of said first or said second three-dimensional article(s) simultaneously.

21. The method according to claim 1, wherein all scan lines in the three dimensional article are provided with a time sink at least one of before or after the scan line.

22. The method according to claim 1, wherein at least one scan line in the three dimensional article is not provided with a time sink at least one of before or after the scan line.

23. A program element configured and arranged when executed on a computer a method for forming a three-dimensional article through successive fusion of locations of a powder bed, which locations correspond to successive cross sections of the three-dimensional article, said method comprising the steps of:

providing a model of said three-dimensional article;

applying a first powder layer on a work table;

determining a maximum scan length of an energy beam for each cross section of said three-dimensional article; and directing said energy beam from a first energy beam source over said work table with a constant scan speed and constant energy causing said first powder layer to fuse in first selected locations according to said model to form a first cross section of said three-dimensional article, where said first energy beam is fusing said selected locations with parallel scan lines in a first direction, wherein locations with a shorter scan length than said maximum scan length is provided with a time sink at least one of before or after said scan line so that the time period between each two adjacent scan lines is constant throughout the manufacture of said three-dimensional article.

24. A computer readable medium having stored thereon the program element according to claim 23.

25. A non-transitory computer program product comprising at least one non-transitory computer-readable storage medium having computer-readable program code portions embodied therein, the computer-readable program code portions comprising:

an executable portion configured for, upon receipt of a model of at least one three dimensional article, applying a first powder layer on a work table so as to initiate forming said three-dimensional article through successive fusion of locations of a powder bed, which locations correspond to successive cross sections of the three-dimensional article;

an executable portion configured for determining a maximum scan line time of an energy beam for a first cross section of the three-dimensional article; and an executable portion configured for directing said energy beam from a first energy beam source over said work table with a constant energy causing said first powder layer to fuse in first selected locations according to said model to form said first cross section of said three-dimensional article, wherein:

said first energy beam is fusing said selected locations with scan lines in a first direction; and locations with a shorter scan line time than said maximum scan line time are provided with a time sink at least one of before or after said scan line so that the scan line time plus the time sink is constant for said first cross section of said three-dimensional article.

* * * * *